Figure 1:
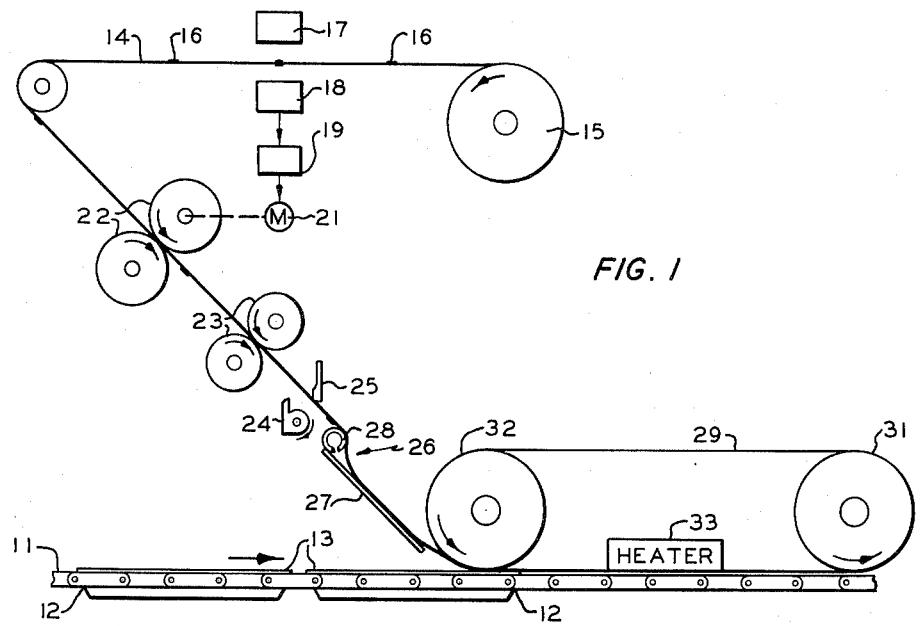

Jan. 4, 1966   J. M. BADER   3,227,017
TRANSPORTING FILM
Filed June 18, 1962

INVENTOR.
J.M. BADER
BY
Young and Quigg
ATTORNEYS

United States Patent Office 3,227,017
Patented Jan. 4, 1966

3,227,017
TRANSPORTING FILM
Julius M. Bader, Mountainside, N.J., assignor to Phillips
Petroleum Company, a corporation of Delaware
Filed June 18, 1962, Ser. No. 203,243
6 Claims. (Cl. 83—24)

This invention relates to method and apparatus for transporting film. In one aspect the invention relates to conveying thin sheets of material such as plastic film or metal foil. In another aspect the invention relates to tarnsporting film on a fluid cushion. In another aspect the invention relates to conveying a film across a surface by introducing one or more streams of high velocity fluid between said film and said surface in the direction of travel of said film. In a still further aspect the invention relates to method and apparatus for securing a film cover to a container. In yet another aspect the invention relates to method and apparatus for conveying and registering cover sheets onto thermoplastic containers.

In recent years plastic containers having a film cover have achieved considerable commercial success in the packaging field and particularly in the area of food packaging. In the newer packaging processes of heat sealing covers cut from flexible film onto thermoformed containers, it is important to maintain high handling speeds. A rate of containers sealed as high as 600 per minute has been contemplated. At such rates precutting and stamping greatly complicates the sealing operation by requiring the handling of individual covers which are to be matched with the containers. The thin films are also extremely difficult to convey in single sheets onto the containers. Many of the present processes require the utilization of a system of complicated belts and/or a suction cup transport system to convey the film.

However, regardless of whether the film covers are handled as separate covers or as a continuous film, the static buildup in the film and the stickiness of the film may be extremely troublesome in conveying systems. Furthermore in the food industry conveying systems utilizing belts or suction cups are a source of combination and must be serviced frequently to maintain purity.

In accordance with the invention there is provided a method and apparatus for transporting film by utilizing a transporting medium of one or more fluid streams, thus entirely eliminating the requirement of conveyor belts and/or suction cup systems for transporting the film. A film transporting system in accordance with the invention provides a frictionless film transport which is both sanitary and easy to service. The fluid cushion can be achieved by introducing one or more streams of a suitable fluid, such as air, between the film and a surface over which the film is to be transported in the direction of movement of the film. In many processes the invention has particular value in that nitrogen can be utilized to provide the fluid cushion and also to replace air from the container with nitrogen as the film cover is secured to the container.

Accordingly it is an object of this invention to provide a novel method and apparatus for transporting film. Another object of the invention is to provide a frictionless film transport system. Yet another object of the invention is to provide a sanitary film transport system. A still further object of the invention is to provide a film transport system which is easy to service. Another object of the invention is to provide a film transport system which is unaffected by a static buildup on the film. A still further object of the invention is to provide a film transport system which is unaffected by the stickiness of the film.

Other aspects, objects, and advantages of the invention will be apparent from a study of the disclosure, the drawing and the appended claims to the invention.

Figures 2, 3, 4, 5:
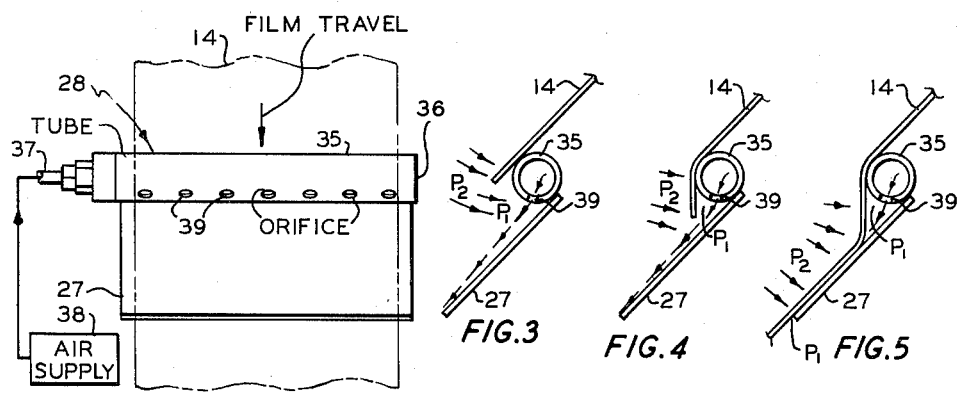

Referring now to the drawings:
FIGURE 1 is a diagrammatic representation of a container sealing operation embodying a film transport system in accordance with the invention;
FIGURE 2 is a side elevation view of the fluid cushion forming means of FIGURE 1; and
FIGURES 3, 4 and 5 are diagrammatic representation of the relationship between the film and the fluid cushion at different points of progress of the film across the fluid cushion forming means.

Referring now to the drawings and to FIGURE 1 in particular there is shown a pocketed chain conveyor belt 11 having a plurality of pockets 12 therein for conveying a number of spaced formed containers 13. A flexible continuous film 14 of a suitable material is drawn from a roll 15. Film 14 can be a thermoplastic material, such as polyethylene, a metal foil such as aluminum foil, or laminates of thermoplastic and metal foil. Film 14 can be preprinted, if desired, with a repetitive series of package labels of a desired design, each of which is adapted to the size and contents of the containers 13 which are to be sealed. An indexing mark 16 can be provided on film 14 for use in aligning the labels with the containers. Film 14 can be passed between a light source 17 and a light detector 18, such as a photocell, for the purpose of detecting the indexing marks 16. The output of light detector 18 can be applied to motor controller 19 to actuate motor 21 for the purpose of driving draw rolls 22 at a rate responsive to the time of occurrence of the indexing marks 16. Thus the linear velocity of film 14 past draw rolls 22 can be differentially adavnced or retarded by motor 21 responsive to light detector 18, thereby maintaining the printed covers in correct relationship with the containers 13.

The film 14 is fed from draw rollers 22 to a pair of corrugating rolls 23 which stiffen the film by rolling a structural continuous embossure with the film. Such embossures can be variable in depth, size and width by adjustment of corrugating rolls 23. Corrugating rolls 23 can be rotated at a surface linear speed appreciably greater than the draw roll feed so that the corrugating rolls 23 continuously slip on the film. This action tends to hold the film 14 in tension and is beneficial in transporting the film. The corrugating rolls 23 push a stiffened edge of film 14 past rotary knife 24 and stationary blade 25 onto the jet film transport assembly 26 which comprises a surface 27 over which the film 16 is to be transported and a fluid source 28. Rotary knife 24 makes one revolution per print or label repeat. The stiffened leading portion of film 14 is fed between container 13 to which it is to be sealed and two heated tack-sealing tapes 29 which are driven by rollers 31 and 32 so that that portion of tapes 29 which are in contact with film 14 travels in the same direction and at substantially the same speed as film 14 and conveyor belt 11. Heaters 33 are provided adjacent tapes 29 to heat tapes 29 to tack the edges of film 14 to the edges of container 13. The leading portion of film 14 can be tacked to container 13 and then film 14 can be cut by rotary knife 24 to form individual covers. While any suitable means can be utilized for sealing film 14 to the containers 13, the presently preferred system is disclosed and claimed in my copending application Serial No. 167,685, filed January 22, 1962.

Referring now to FIGURE 2 fluid source 28 is illustrated as being a cylindrical tube 35 having one end 36 plugged and a conduit 37 connected between the other end thereof and a suitable air supply 38. Tube 35 contains a plurality of orifices 39 spaced at intervals along the length thereof adjacent sheet 27. Sheet 27 provides the surface across which film 14 is to be transported, and can be attached to tube 28. In one device which utilized the film transport system of the present invention, a series of orifices 39 having a diameter of approximately .013 inch, were spaced at intervals of approximately .5 inch along tube 35 so as to direct the air flow toward flat sheet 27, and air at approximately 2 p.s.i.g. was introduced into tube 35 through conduit 37. The resulting airstream created a cushion between film 14 and sheet 27 and also caused a differential pressure between the pressure between sheet 27 and film 14 and the atmospheric pressure above film 14 resulting in the film 14 being firmly pressed against the fluid cushion. Film 14 was transported across sheet 27 without actual contact therewith. While tube 35 has been described as being cylindrical, any suitable shape can be utilized. Routine tests will disclose the number and size of orifices 39 desired for a particular application.

Referring now to FIGURES 3, 4 and 5 the fluid flow through orifices 39 creates a drop in pressure adjacent tube 35 with $P_2$ being greater than $P_1$. In FIGURE 3 the leading edge of film 14 is passed over tube 35 and is drawn downwardly toward sheet as shown in FIGURE 4 by the differential pressure of $P_2-P_1$. As film 14 advances the leading edge thereof comes in close proximity to sheet 27, but is prevented from touching sheet 27 due to the air flow from orifices 39. As the film continues to advance film 14 is supported on a thin layer of high velocity fluid, as shown in FIGURE 5. Film 14 is firmly held flat against the fluid cushion by the differential pressure $(P_2-P_1)$ and is kept in motion by the film advance draw rolls 22 (FIGURE 1) and also by the high velocity flow of the film boundary layer of fluid. After film 14 has been cut by rotary knife 24 the cut film is maintained in motion by the high velocity of the film boundary layer and/or pull of tacking of the cut film to a container 13. The hold-down force which results from the passage of the high velocity fluid layer by the film 14 and sheet 27 is proportional to the fluid flow velocity. In many processes it is desirable that the low velocity of the fluid from orifices 39 be greater than the surface linear velocity of the film advance draw rolls 22, thus resulting in holding the film 14 in tension and assisting in the conveyance of the film to the final lay down position over the respective container 13. If desired, the fluid from fluid source 28 can be heated to aid in preparing film 14 for sealing. While fluid source 28 has been described as having a plurality of orifices to produce a plurality of fluid streams, other suitable means such as a long slit can be utilized to produce one high velocity fluid stream.

Reasonable variation and modification are possible within the scope of the foregoing disclosure, the drawing and the appended claims to the invention.

I claim:

1. Film transporting apparatus comprising: a stationary guide member having greater width than the film to be transported; a perforated tube disposed transverse to the direction of film travel adjacent one end of said guide member for jetting a fluid in a uniform stream having substantially the width of the film to be transported along the surface of said guide member; and means for supplying film over said tube onto said guide member in the direction of said fluid flow; said fluid stream maintaining said film spaced uniformly from said guide member and the movement of said fluid stream being the only applied force for moving said film along said guide member.

2. The apparatus of claim 1 wherein said perforated tube has a plurality of orifices therein spaced along the length of said tube and means for supplying air under pressure to said tube.

3. The apparatus of claim 1 wherein said perforated tube has a slit therein along the length of said tube and means for supplying air under pressure to said tube.

4. The method for continuously feeding smooth and flat lengths of flexible plastic film from a roll to a package-closing device comprising: intermittently severing said film from said roll into desired film lengths; passing the leading cut edges of said film lengths suspended in space over a perforated tube disposed transverse to the direction of film travel adjacent one end of a stationary guide member wider than said film positioned between said roll and said device; jetting a fluid along said guide member from said perforated tube to obtain a uniform stream having substantially the width of said film in the direction of travel of said film between said film and said stationary guide to create a pressure differential between above and below said film lengths which causes said film lengths to be held flat and smooth against said fluid stream; and moving said film lengths on said fluid stream along said stationary guide member, the movement of said fluid stream being the only applied force for moving said film lengths and further being applied only from said perforated tube.

5. The method of claim 4 wherein said fluid is jetted as a single flat stream of the defined widths.

6. The method of claim 4 wherein said fluid is jetted as a plurality of streams in alignment along the defined widths.

References Cited by the Examiner

UNITED STATES PATENTS

| | | | |
|---|---|---|---|
| 2,151,136 | 3/1939 | Moffitt. | |
| 2,261,972 | 11/1941 | Matthews. | |
| 2,684,240 | 7/1954 | Lindey | 222—88 |
| 2,717,710 | 9/1955 | Baker et al. | 226—88 |
| 2,793,856 | 5/1957 | Nixon | 226—88 |
| 3,008,865 | 11/1961 | Hays et al. | 226—97 |
| 3,066,882 | 12/1962 | Havens et al. | 226—97 X |

FOREIGN PATENTS 581,836  10/1946  Great Britain.

ROBERT B. REEVES, *Primary Examiner.*

ANDRES H. NIELSEN, RAPHAEL M. LUPO, SAMUEL F. COLEMAN, ROBERT B. REEVES,
*Examiners.*